US012696263B2

(12) United States Patent
Harada et al.

(10) Patent No.: US 12,696,263 B2
(45) Date of Patent: Jul. 28, 2026

(54) TERMINAL AND BASE STATION

(71) Applicant: NTT DOCOMO, INC., Tokyo (JP)

(72) Inventors: Hiroki Harada, Tokyo (JP); Shohei Yoshioka, Tokyo (JP); Shinya Kumagai, Tokyo (JP); Daisuke Kurita, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 280 days.

(21) Appl. No.: 17/796,764

(22) PCT Filed: Feb. 7, 2020

(86) PCT No.: PCT/JP2020/005005
§ 371 (c)(1),
(2) Date: Aug. 1, 2022

(87) PCT Pub. No.: WO2021/157098
PCT Pub. Date: Aug. 12, 2021

(65) Prior Publication Data
US 2023/0076250 A1 Mar. 9, 2023

(51) Int. Cl.
*H04W 72/1263* (2023.01)
*H04W 72/20* (2023.01)

(52) U.S. Cl.
CPC ....... *H04W 72/1263* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 10,721,724 B2 * | 7/2020 | Miyamoto | ............ | H04W 16/02 |
| 2013/0010721 A1 * | 1/2013 | Aiba | ...................... | H04W 76/20 |
| | | | | 370/329 |
| 2013/0083709 A1 * | 4/2013 | Ahn | ...................... | H04L 5/0016 |
| | | | | 370/280 |
| 2013/0310037 A1 * | 11/2013 | Ji | ...................... | H04W 36/0085 |
| | | | | 455/436 |
| 2018/0199268 A1 * | 7/2018 | Wang | ...................... | H04L 5/0053 |
| 2019/0123849 A1 * | 4/2019 | Baldemair | ............ | H04L 1/0009 |
| 2019/0288820 A1 | 9/2019 | Lyu et al. | | |

(Continued)

FOREIGN PATENT DOCUMENTS

| | | |
|---|---|---|
| CN | 107852718 A | 3/2018 |
| CN | 108270509 A | 7/2018 |

OTHER PUBLICATIONS

International Search Report issued in PCT/JP2020/005005 on Sep. 8, 2020 (3 pages).

(Continued)

*Primary Examiner* — Adnan Baig
(74) *Attorney, Agent, or Firm* — Osha Bergman Watanabe & Burton LLP

(57) ABSTRACT

A terminal includes a receiving unit that receives a transport block, and that receives, at a first timing at which a portion of the whole transport block is received, control information on another portion of the transport block to be received at a second timing after the first timing; and a transmitting unit that transmits feedback information on reception of the control information while the receiving unit receives the transport block.

4 Claims, 10 Drawing Sheets

(56) References Cited

U.S. PATENT DOCUMENTS

| | | | | |
|---|---|---|---|---|
| 2019/0373607 A1* | 12/2019 | Zhang | ................... | H04L 1/1854 |
| 2021/0143963 A1* | 5/2021 | Matsuda | ............... | H04L 5/0037 |
| 2021/0212039 A1 | 7/2021 | Takeda et al. | | |
| 2021/0385826 A1* | 12/2021 | Moon | ................... | H04W 72/23 |

OTHER PUBLICATIONS

Written Opinion of the International Searching Authority issued in PCT/JP2020/005005 on Sep. 8, 2020 (3 pages).
NTT DOCOMO, Inc.; "White Paper 5G Evolution and 6G"; Jan. 2020 (17 pages).
3GPP TS 38.213 V16.0.0; "3rd Generation Partnership Project; Technical Specification Group Radio Access Network; NR; Physical layer procedures for control (Release 16)"; Dec. 2019 (146 pages).
3GPP TS 38.133 V16.2.0; "3rd Generation Partnership Project; Technical Specification Group Radio Access Network; NR; Requirements for support of radio resource management (Release 16)"; Dec. 2019 (1129 pages).
Office Action issued in counterpart Chinese Patent Application No. 202080094950.9 mailed on Aug. 22, 2024 (15 pages).
Office Action issued in Chinese Patent Application No. 202080094950.9, dated Mar. 22, 2025 (15 pages).
Office Action issued in Chinese Application No. 202080094950.9; Dated Jul. 26, 2025 (12 pages).

* cited by examiner

TERMINAL IS ACTIVE
(ON)

DEACTIVATED
(OFF)

TRAFFIC

TIME

DEACTIVATED (OFF)
TIME IS LONG,
AND POWER CONSUMPTION
IS REDUCED

TRAFFIC

TIME

| Configuration | | SCS 15 kHz | SCS 30 kHz | SCS 60 kHz | SCS 120 kHz |
|---|---|---|---|---|---|
| PDSCH w/ front-loaded DMRS | N1 | 8 symbols / 572 μs | 10 symbols / 358 μs | 17 symbols / 304 μs | 20 symbols / 179 μs |
| PDSCH w/ front + additional DMRS | N1 | 13 symbols / 930 μs | 13 symbols / 465 μs | 20 symbols / 358 μs | 24 symbols / 215 μs |
| Any case of PUSCH | N2 | 10 symbols / 715 μs | 12 symbols / 429 μs | 23 symbols / 411 μs | 36 symbols / 322 μs |
| LTE PDSCH (benchmark) | N1 | 3000 μs | N/A | N/A | N/A |
| LTE PUSCH (benchmark) | N2 | 3000 μs | N/A | N/A | N/A |

TERMINAL AND BASE STATION

TECHNICAL FIELD

The present invention relates to a terminal and a base station in a radio communication system.

BACKGROUND ART

A study on a sixth generation mobile communication technology (which is referred to as Beyond 5G, 5G evolution, 6G, or the like) has been started domestically and internationally with a goal of completing specifications in 2025. For example, Ministry of Science and Technology of China has announced in November 2019 that genuine research and development of 6G have been started.

As candidates for study items for Beyond 5G and 6G, for example, the following study items have been assumed.

To develop a new frequency band. For example, a frequency band higher than or equal to 100 GHz, a terahertz band, and the like may be studied to newly develop as a 6G frequency band.

To achieve a higher data rate in the existing 5G frequency band (which is lower than or equal to 100 GHz). Specifically, narrowing of beams, cooperative transmission and reception among base stations, cooperative transmission and reception among terminals, and the like may be studied.

Reduction of power consumption of a mobile terminal, a mobile base station, and the like may be studied, and implementation of long-term use of a mobile terminal, a mobile base station, and the like without recharging may be studied.

RELATED ART DOCUMENT

Non-Patent Document

Non-Patent Document 1: White Paper 5G Evolution and 6G, NTT DOCOMO, INC, January 2020
Non-Patent Document 2: 3GPP TS 38.213 V16.0.0 (2019-12)
Non-Patent Document 3: 3GPP TS 38.133 V16.2.0 (2019-12)

SUMMARY OF THE INVENTION

Problem to be Solved by the Invention

When a transmission/reception process of data and a transmission/reception process of feedback and/or control information are sequentially executed, a temporal gap occurs in association with the feedback and/or the control information.

There is a need for a technique with which a temporal gap associated with feedback and/or control can be reduced.

Means for Solving the Problem

According to an aspect of the present invention, there is provided a terminal including a receiving unit that receives a transport block, and that receives, at a first timing at which a portion of the whole transport block is received, control information on another portion of the transport block to be received at a second timing after the first timing; and a transmitting unit that transmits feedback information on reception of the control information while the receiving unit receives the transport block.

Advantage of the Invention

According to an embodiment, a technique is provided that can reduce a temporal gap associated with feedback and/or control.

BRIEF DESCRIPTION OF DRAWINGS

FIG. 5 is a diagram illustrating an example of a processing time of a terminal.

EMBODIMENTS OF THE INVENTION

Hereinafter, an embodiment of the invention will be described with reference to the accompanying drawings. Note that, the following embodiment is illustrative only, and embodiments to which the invention is applied are not limited to the following embodiments.

It is assumed that a radio communication system in the following embodiments basically conform to NR, but this is merely an example, and the radio communication system in the embodiments may partially or entirely conform to a radio communication system (for example, LTE) other than the NR.

(Overall System Configuration)

Figure 1:
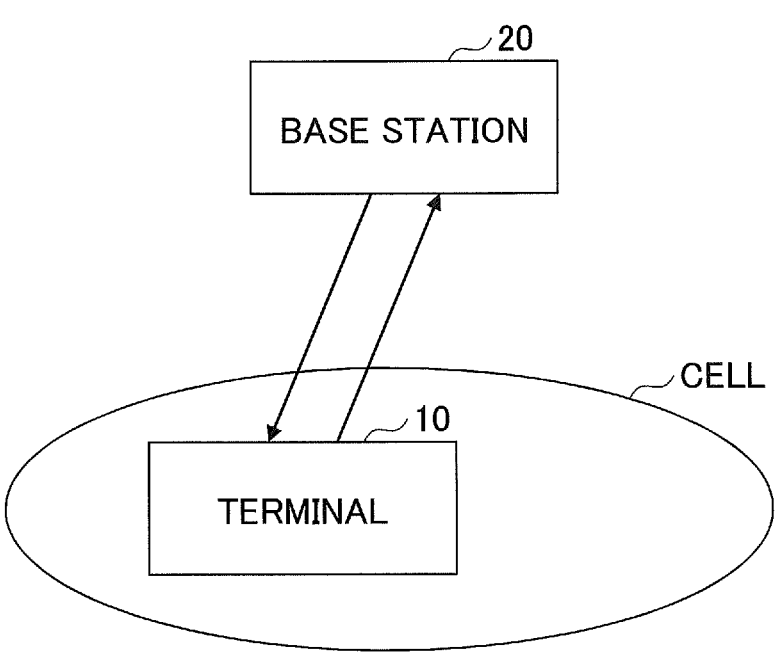
FIG. 1 is a configuration diagram of a communication in an embodiment.

FIG. 1 illustrates a configuration diagram of the radio communication system according to the embodiments. As illustrated in FIG. 1, the radio communication system according to the embodiments includes a terminal 10 and a base station 20. In FIG. 1, one piece of the terminal 10 and one piece of the base station 20 are illustrated, but this is an example, and a plurality of the terminals 10 and a plurality of the base stations 20 may be provided.

The terminal 10 is a communication device such as a smart phone, a portable telephone, a tablet, a wearable terminal, and a communication module for machine-to-machine (M2M) which have a radio communication function. The terminal 10 receives a control signal or data from the base station 20 in DL, and transmits the control signal or the data to the base station 20 in UL to use various communication services provided by the radio communication system. For example, a channel transmitted from the terminal 10 includes a physical uplink control channel (PUCCH) and a physical uplink shared channel (PUSCH). In addition, the terminal 10 may be referred to as a UE, and the base station 20 may be referred to as a gNB.

In the embodiments, a duplex method may be a time division duplex (TDD) method or a frequency division duplex (FDD) method.

In addition, in the embodiment, with regard to description of "a radio parameter or the like is configured", a predetermined value may be pre-configured, or may be configured on the basis of a radio parameter indicated by the base station 20 or the terminal 10.

The base station 20 is a communication device that provides one or more cells and that performs radio communication with the terminal 10. Physical resources of a radio signal are defined in a time domain and a frequency domain, the time domain may be defined by a number of OFDM symbols, and the frequency domain may be defined by a number of sub-carriers or a number of resource blocks. The base station 20 transmits synchronization signals and system information to the terminal 10. The synchronization signals are, for example, NR-PSS and NR-SSS. A part of the system information is transmitted, for example, by NR-PBCH, and is also called broadcast information. The synchronization signal and broadcast information may be periodically transmitted as an SS block (SS/PBCH block) formed of a predetermined number of OFDM symbols. For example, the base station 20 transmits a control signal or data in Downlink (DL) to the terminal 10 and receives a control signal or data in Uplink (UL) from the terminal 10. Both the base station 20 and the terminal 10 are capable of beam forming to transmit and receive signals. For example, a reference signal transmitted from the base station 20 includes a Channel State Information Reference Signal (CSI-RS) and a channel transmitted from the base station 20 includes a Physical Downlink Control Channel (PDCCH) and a Physical Downlink Shared Channel (PDCCH).

(Multi-Numerology)

In order to support a wide range of frequencies and use cases in 5G, it is necessary to support multiple numerologies (radio parameters such as a subcarrier spacing and a symbol length). Accordingly, it is effective to design variable parameters in a scalable manner on the basis of LTE numerology. Based on this idea, Multi-Numerology of NR has been introduced. Specifically, the reference subcarrier spacing is the same as the LTE subcarrier spacing, and is set to 15 kHz. Other subcarrier spacings are defined by multiplying the reference subcarrier spacing by a power of 2. A plurality of subcarrier spacing configurations μ are defined. Specifically, for μ=0, the subcarrier spacing Δf=15 kHz and Cyclic prefix=Normal may be specified; for μ=1, the subcarrier spacing Δf=30 kHz and Cyclic prefix=Normal may be specified; for μ=2, the subcarrier spacing Δf=60 kHz and Cyclic prefix=Normal or Extended may be specified; for μ=3, the subcarrier spacing Δf=120 kHz and Cylic prefix=Normal may be specified; and for μ=4, the subcarrier spacing Δf=240 kHz and Cyclic prefix=Normal may be specified.

The number of OFDM symbols included in one slot is set to 14 for any of the subcarrier spacing configurations μ=0, 1, 2, 3, and 4. However, for the subcarrier spacing configurations μ=0, 1, 2, 3, and 4, the number of slots included in one frame is set to 10, 20, 40, 80, and 160, and the number of slots included in one sub-frame is set to 1, 2, 4, 8, and 16. Here, since the frame length is 10 ms, for the subcarrier spacing configurations μ=0, 1, 2, 3, and 4, the slot lengths are set to 1 ms, 0.5 ms, 0.25 ms, 0.125 ms, and 0.625 ms. Since the number of OFDM symbols included in one slot is set to 14 for any of the subcarrier spacing configurations μ=0, 1, 2, 3, and 4, the OFDM symbol lengths differ for every subcarrier spacing configurations. For the subcarrier spacing configurations μ=0, 1, 2, 3, and 4, the OFDM symbol lengths are set to (1/14) ms, (0.5/14) ms, (0.25/14) ms, (0.125/14) ms and (0.0625/14) ms. As described above, by shortening the slot length and the OFDM symbol length, low-latency communication can be achieved. For example, the base station 20 can configure the subcarrier spacing for the terminal 10 by specifying any of μ=0, 1, 2, 3, and 4 in a subcarrier spacing that is a parameter of an information element BWP.

Figure 2:
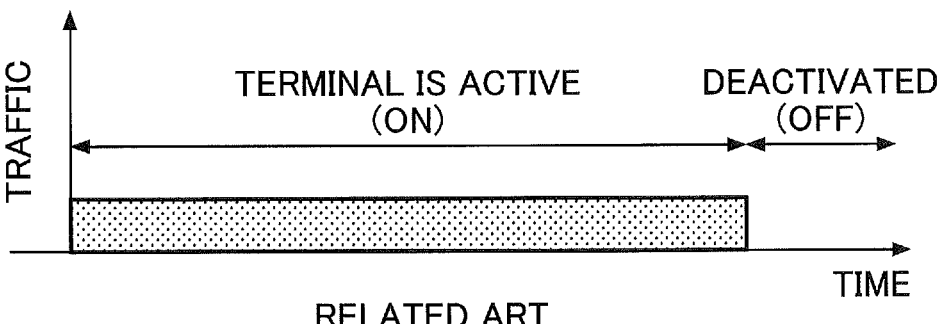
FIG. 2 is a diagram illustrating an example of relation between time and traffic in a radio communication technology according to related art.

For example, FIG. 2 is a diagram illustrating an example of the relationship between time and communication volume according to the radio communication technology according to related art. As illustrated in the example of FIG. 2, when the attainable data rate is not so high (for example, lower than or equal to 1 Gbps), the time to make the terminal 10 active (ON) may be longer than the time to make the terminal 10 inactive (OFF).

Figure 3:
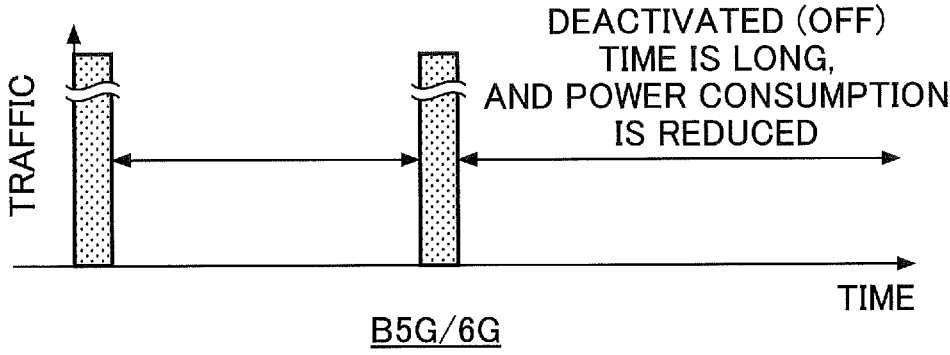
FIG. 3 is a diagram illustrating an example of relation between time and traffic in a radio communication technology that can achieve a high data rate.

In contrast, as illustrated in FIG. 3, for example, when the attainable data rate is high (for example, higher than or equal to 10 Gbps), it is expected that the communication is completed in a short period of time and, thus, during a longer time period other than the short time, communication is not performed. Accordingly, as illustrated in the example of FIG. 3, the time for making the terminal 10 active (ON) is considered to be shorter than the time for making the terminal 10 inactive (OFF).

Problem

In the fourth generation mobile communication system (4G, e.g., Long Term Evolution (LTE)) and the fifth generation mobile communication system (5G, e.g., New Radio (NR)), it is possible to measure and report a channel state, measure and report an appropriate transmission/reception beams, determine modulation coding schemes, determine allocated resources, determine beams, or the like by transmitting and receiving reference signals.

When the first transmission is not successful, retransmission data can be efficiently transmitted by Hybrid Automatic Repeat Request (HARQ).

However, for the HARQ, for example, a data transmission, feedback, and a retransmission may be performed between the terminal 10 and the base station 20. When the reference signal is used, for example, channel state measurement, feedback, and data transmission (reflecting feedback) may be performed between the terminal 10 and the base station 20. In these cases, for example, a time gap is assumed to occur due to a decoding delay. For example, the minimum delay or the like between data transmission and feedback transmission is specified in a technical specification.

In the frequency band of 3 GHz or higher, only the frequency band used for TDD is defined, and for example, it is necessary to secure a time gap before and after feedback of HARQ so that switching between downlink (DL) communication and uplink (UL) communication can be performed.

Here, suppose that discontinuous communication as illustrated in FIG. 3 is performed when the peak data rate is high.

In this case, a ratio of a temporal overhead caused by inserting the feedback becomes relatively large, and the efficiency of communication may decrease.

In this regard, instead of relying on feedback, open loop control (outer loop, for example, which attempts to communicate with conservative parameters at first and then changes to parameters that gradually increase the data rate if communication is successful) may be applied to perform communication on the assumption that the communication parameters are to be corrected. However, in this case, the frequency utilization efficiency may be lowered by applying a conservative parameters. Furthermore, many retransmissions may occur by applying parameters that increase the data rate. Accordingly, when the open-loop control is applied, communication may not be optimized, and a longer communication time may be required. Accordingly, in comparison with open-loop control, it is considered that a method in which feedback is performed and communication parameters are optimized is more efficient in communication.

(SCell Activation Delay)

Figure 4:
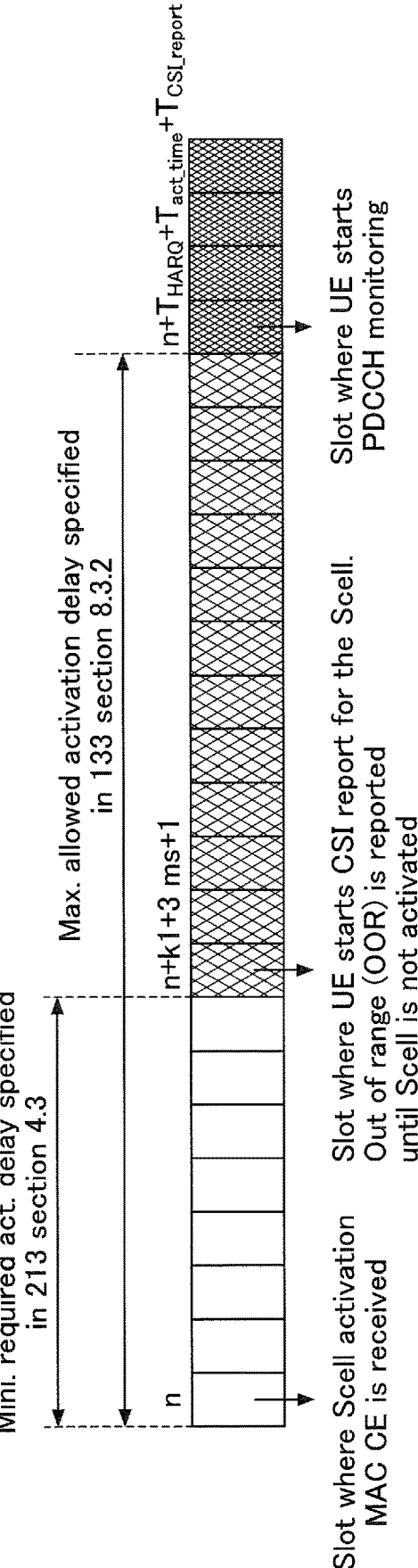
FIG. 4 is a diagram illustrating an example of SCell activation delay.

FIG. 4 is a diagram illustrating an example of the SCell activation delay of release 15/16 NR. As illustrated in FIG. 4, for example, after the terminal 10 receives an activation command for setting the SCell in the deactivated state (a state in which the terminal 10 is not performing PDCCH monitoring and CSI measurement/reporting) to the activated state (a state in which the terminal 10 can receive the PDCCH), it takes at least k1+3 ms+1 slot (the time for the terminal 10 to return HARQ feedback for PDSCH including the activation command+3 ms+1 slot) to return the SCell from the deactivated state to the activated state. As a requirement in a technical specification, it is specified that SCell activation may take longer time, including margins, such as a time until receiving an SSB resource and a CSI measurement resource for the next time and a time for reconfiguring a reception beam.

(The Processing Time of the Terminal 10)

Figure 6:
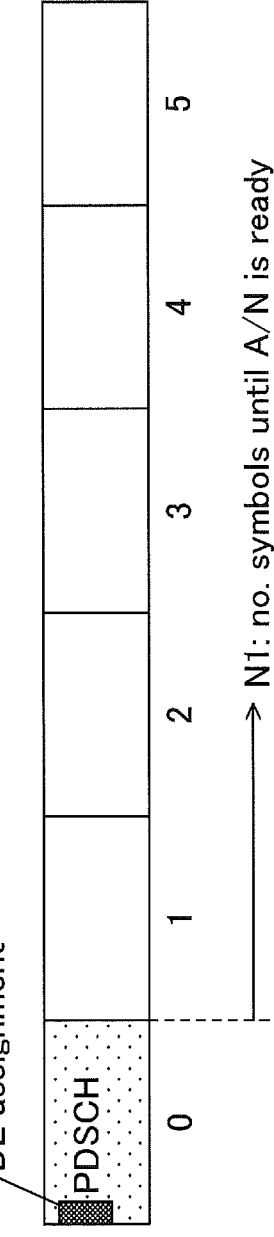
FIG. 6 is a diagram illustrating an example of a time for a terminal to execute, after receiving a PDSCH, a process to complete a preparation of a corresponding ACK/NACK transmission.
Figure 7:
FIG. 7 is a diagram illustrating an example of a time for completing, after receiving a PDCCH including a UL grant, a preparation of a corresponding PUSCH transmission.

FIG. 5 is a diagram illustrating an example of the processing time of the terminal 10. N1 illustrated in FIG. 5 may be, for example, the number of OFDM symbols corresponding to the time required for the terminal 10 to perform processing after receiving the PDSCH and to complete the preparation for transmission of the corresponding ACK/NACK, as illustrated in FIG. 6. In addition, N2 illustrated in FIG. 5 may be, for example, the number of OFDM symbols corresponding to the time required for the terminal 10 to perform processing and to complete the preparation for transmission of the corresponding NR-PUSCH, after receiving a PDCCH including a UL grant, as illustrated in FIG. 7. In the example of FIG. 5, for example, the value of N1 for "PDSCH with front+additional DMRS" is larger than the value of N1 for "PDSCH with front-loaded DMRS" because the preparations for transmitting ACK/NACK are completed after receiving "additional DMRS."

(Proposal)

In the following embodiments, a method for reducing a time gap associated with feedback and/or control is proposed by performing processing of data transmission/reception and processing of feedback and/or control information transmission/reception in parallel. By performing discontinuous transmission and reception with low time overhead and high frequency utilization efficiency, power consumption of the terminal 10 can be reduced and system frequency utilization efficiency can be enhanced. In the following embodiments, the duplex method may be a Time Division Duplex (TDD) method, a Frequency Division Duplex (FDD) method, or any other method (for example, Flexible Duplex, Full Duplex, or the like). In the following embodiments, "simultaneously" may mean exactly the same timing or that all or a portion of time resources (e.g., one or more symbols (which may be a shorter time unit resource than the symbol) are the same or overlap.

(1. DL Data Reception+UL Feedback Transmission)

The terminal 10 may simultaneously receive one or more transport blocks and transmit channel quality information and/or feedback information, such as a retransmission request, generated based on the reception of the one or more transport blocks. For example, the terminal 10 may receive a downlink channel (for example, PDSCH, PDCCH, or the like) including one or more transport blocks and simultaneously transmit channel quality information and/or feedback information, such as a retransmission request, generated based on the reception, using the uplink channel (for example, PUSCH, PUCCH, or the like). In this case, if the duplex method is the TDD method, for example, the terminal 10 may be configured with a TDD carrier dedicated to UL and a corresponding TDD carrier dedicated to DL.

For example, the carrier on which the terminal 10 receives data may be the same as the carrier on which the feedback information is transmitted. For example, the carrier on which the terminal 10 receives data may be different from the carrier on which the feedback information is transmitted. When the carrier on which the terminal 10 receives data and the carrier on which the terminal 10 transmits feedback information are different, the base station 20 (or the terminal 10) may configure information indicating a correspondence relationship between the carrier on which the terminal 10 receives data and the carrier on which the terminal 10 transmits feedback information, and the base station 20 (or the terminal 10) may transmit, to the terminal 10 (or the base station 20), a notification of the configured information. The terminal 10 may receive, from the base station 20, information relating to a frequency resource (or carrier) on which the terminal 10 receives data and/or a frequency resource (or a frequency resource candidate or a carrier) on which the terminal 10 transmits feedback information (for example, information indicating a correspondence between a carrier on which the terminal 10 receives data and a carrier on which the terminal 10 transmits feedback information). Furthermore, information on the frequency resource candidate to be used in transmitting or receiving (for example, a frequency resource used for reception and one or more frequency resource candidates used for transmission) may be received by RRC signaling and the frequency resource to be used for transmission may be determined by the downlink control information. The correspondence may also be specified in a technical specification.

For example, new feedback information may be specified as the feedback information. For example, the terminal 10 may transmit only a portion of the existing feedback information, as the feedback information.

For example, when the terminal 10 receives a transport block and transmits feedback information at the same time, if there are a plurality of transport blocks (TB) or a single TB is formed of a plurality of code block groups (CBG), the feedback information transmitted by the terminal 10 may be feedback information for the TB or CBG received until the transmission timing. Alternatively, the feedback information may be feedback information about the reception result up to the middle of one TB/CBG.

For example, when the terminal 10 receives the transport block and simultaneously transmits feedback information, the feedback information may be soft information corresponding to a likelihood (for example, it may be an index indicating that a portion of the transport block is correctly received, that is, a portion of the transport block is correctly received with the probability of 90%), instead of ACK or NACK. The soft information may be calculated per time resource (for example, per symbol or per symbols), or may be a value calculated per frequency resource (for example, per one subcarrier or per subcarriers), per frequency/time resource, or per information amount (for example, a predetermined number of bits). The terminal 10 may also generate and transmit soft information based on one or more likelihood values (for example, if the likelihood exceeds a predetermined threshold).

For example, the terminal 10 may generate feedback information, such as channel information, based on a demodulation reference signal or based on another reference signal, such as a reference signal for channel estimation.

For example, the terminal 10 may modulate and encode the feedback information and transmit the feedback information. Furthermore, for example, the terminal 10 may transmit the feedback information by mapping the feedback information onto a sequence of a reference signal and/or sequence of a preamble.

For example, when the terminal 10 transmits information corresponding to NACK, as the feedback information, one of the following or a combination of the following may be included in (or instead of) the NACK/CSI report (CQI/RI/ PMI).

Beam report (for example, an index of another candidate beam, an L1-RSRP measurement, or the like)

Redundancy Version (RV) request (for example, information indicating the RV for retransmission)

Sounding Reference Signal (SRS) (for example, when the SRS is transmitted, the base station 20 interprets it as equivalent to NACK and corrects the transmission parameters based on the reception result of the SRS and the radio propagation path reciprocity)

For example, a radio resource (a time and frequency domain resource) that the terminal 10 uses to transmit feedback information may be semi-statically configured by RRC signaling or the like, configured and activated by a MAC CE or the like, or dynamically assigned by L1 signaling or the like.

For example, if a radio resource that the terminal 10 uses to transmit feedback information is configured by the RRC signaling, the terminal 10 may use the radio resource only within a certain period of time (for example, within a particular slot) when DL scheduling information is received in DCI. Here, one or more radio resource candidates may be configured by the RRC signaling, or information indicating the radio resource may be included in the DCI. In this case, the terminal 10 may select and use a radio resource based on information indicating the radio resource included in the DCI from the one or more radio resource candidates.

For example, when PUSCH is assigned to the terminal 10 as a resource for transmitting feedback information, the terminal 10 may perform the following operations.

For example, in a case where feedback information corresponding to ACK is to be transmitted, the terminal 10 may transmit a Buffer Status Report (BSR) by using a MAC CE. As a result, the terminal 10 can transmit, to the base station 20, a notification of the amount of remaining data to be transmitted.

For example, the terminal 10 may transmit a beam report and/or an RV request by using a MAC CE when the feedback information corresponding to NACK is to be transmitted.

Figure 8:
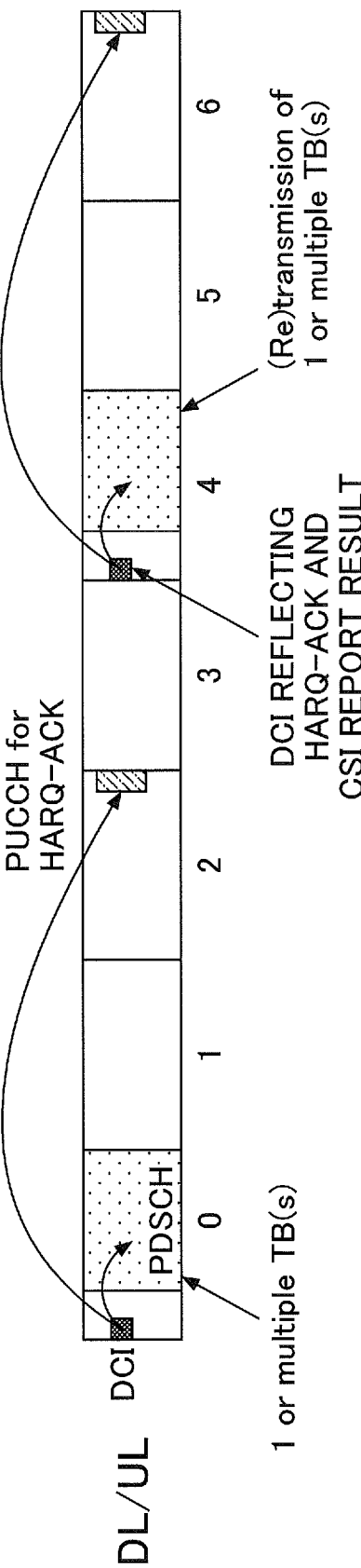
FIG. 8 is a diagram illustrating an example in which a DL data reception and a UL feedback transmission are executed at different timings.

FIG. 8 is a diagram illustrating an example in which DL data reception and UL feedback transmission are performed at different timings. In the example of FIG. 8, DL data is received in slot 0, and, subsequently, UL feedback is performed in slot 2.

Figure 9:
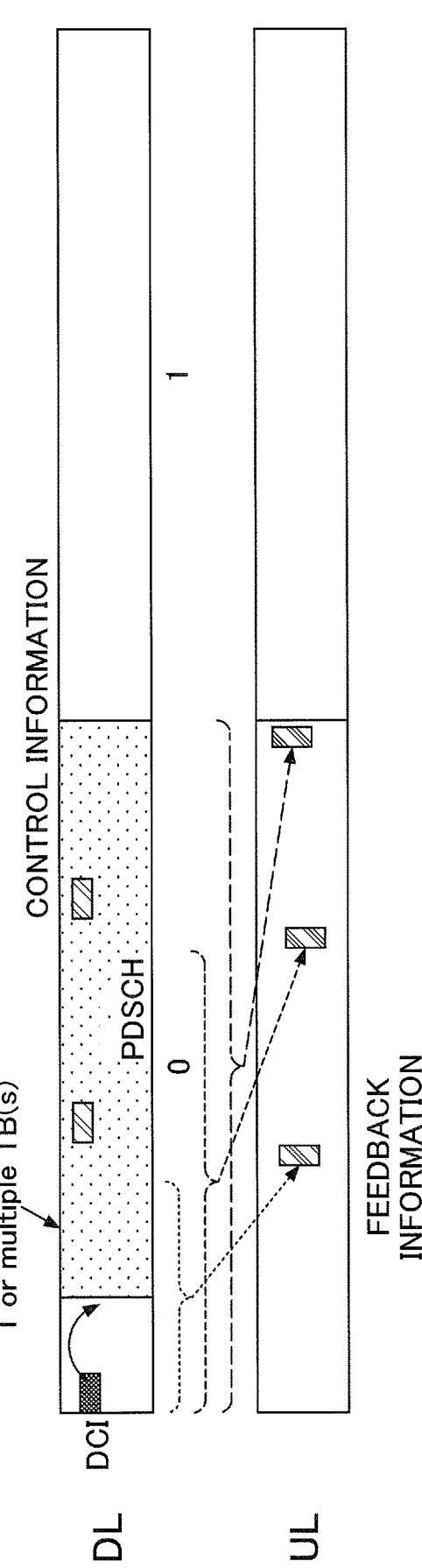
FIG. 9 is a diagram illustrating an example in which a DL data reception and a UL feedback transmission are executed at a same time.

FIG. 9 is a diagram illustrating an example of performing DL data reception and UL feedback transmission simultaneously. In the example of FIG. 9, UL feedback transmission is performed for the reception of the start portion of the DL data, UL feedback transmission is performed for the reception of the first half portion of the DL data, and UL feedback is performed for the reception of the entire DL data. As described above, by receiving the UL feedback in the middle of the DL data transmission, the base station 20 can modify the Modulation and Coding Scheme (MCS), the beam, or the like applied to the subsequent DL data transmission based on the received UL feedback.

(2. DL Data Reception+DL Control Information Reception)

The terminal 10 may receive one or more contiguous transport blocks and one or more items of control information associated with the transport blocks on the same channel (for example, the same PDSCH) or on different channels (for example, the transport block may be received on a PDSCH and its control information may be received on the PDCCH).

For example, one or more items of control information may be discontinuously allocated at the start of the channel transmission time, in the middle of the channel transmission time, and at the end of the channel transmission time.

For example, new control information (e.g., only a portion of the DCI) may be defined. The terminal 10 may receive the new control information. For example, among the identifier of the DCI format, resource information, information related to the transport block, information related to Hybrid Automatic Repeat Request (HARQ), information related to multiple antennas, and information related to Physical Uplink Control Channel (PUCCH) included in the DCI, control information including only information related to the transport block may be used as the new control information. The same identifier may be attached to the control information arranged at the start of the channel transmission time, the control information arranged in the middle of the channel transmission time, and the control information arranged at the end of the channel transmission time, or different identifiers may be attached to them. The information included in the control information arranged at the start of the channel transmission time, the control information arranged in the middle of the channel transmission time, and the control information arranged at the end of the channel transmission time may be the same or different. For example, the first control information may include all of the above-described information, and the other control information may include some information, such as an identifier indicating the first control information, an identifier indicating the other control information, and/or difference information (for example, information related to multiple antennas).

For example, if the base station 20 is to simultaneously transmit the control information and the DL data to the terminal 10 and there are a plurality of transport blocks (TB) or one transport block includes a plurality of code block groups (CBG), the control information may be used as control information for the TB or CBG to be transmitted after the transmission timing. Alternatively, the content sent in the first DCI may be added and/or overwritten by the additional control information for the single TB or CBG (for example, the updated value of the Modulation and Coding Scheme (MCI) index).

For example, the base station 20 may modulate and encode the control information and transmit the control information. The base station 20 may transmit the control information by mapping the control information onto a sequence of a reference signal or the like and transmitting the reference signal. When the base station 20 modulates and encodes the control information for transmission, the base station 20 may transmit the control information as a channel (for example, PDCCH) different from the channel on which the transport block is being transmitted (for example, PDSCH), or the base station 20 may transmit the control information after individually encoding and mapping the control information onto the same channel (piggyback).

For example, the terminal 10 may include presence of absence of a reception of additional control information in the feedback, and the terminal may transmit the feedback. Furthermore, the feedback of the presence or absence of the reception of the additional control information may be periodically performed or aperiodically performed (for example, based on a request from a base station). If the additional control information (DCI) is not received, the presence or absence of the reception of the additional control information may be reported to the base station 20 as the feedback information.

For example, the terminal 10 may receive data and additional control information on the same carrier or on different carriers. For example, if the carrier on which the terminal 10 receives data is different from the carrier on which the terminal 10 receives the additional control information, the base station 20 (or the terminal 10) may configure information indicating a correspondence relationship between the carrier on which the terminal 10 receives the data and the carrier on which the terminal 10 receives the additional control information, and the base station 20 (or the terminal 10) may transmit, to the terminal 10 (or the base station 20), a notification of the configured information. The correspondence may also be specified in a technical specification.

The base station 20 may semi-statically configure a resource for transmitting control information for the terminal 10 by using RRC signalling or the like. Alternatively or additionally, the base station 20 may dynamically configure a resource to transmit control information by using another DCI. When a DL data transmission and a transmission of DL control information are performed on the same carrier, for example, the base station 20 may, for example, configure a resource for transmitting the control information by rate matching the channel (for example, PDSCH) transmitting the transport block. Additionally or alternatively, the base station 20 may dynamically map the control information and puncture the channel (For example, PDSCH) transmitting the transport block.

(3. UL Data Transmission+DL Control Information Reception)

If transmission of UL data (For example, PUSCH) is scheduled for the terminal 10, the terminal 10 may transmit one or more contiguous transport blocks and simultaneously receive one or more control information associated with the transport blocks. For example, the carrier on which the terminal 10 transmits data and the carrier on which the terminal 10 receives control information may be the same or different. When the carrier on which the terminal 10 transmits data and the carrier on which the terminal 10 receives control information are different, the base station 20 may configure information indicating a correspondence relationship between the carrier on which the terminal 10 transmits data and the carrier on which the terminal 10 receives control information, and the base station 20 may transmit, to the terminal 10, a notification of the configured information.

For example, one or more items of control information may be discontinuously allocated at the start of the channel transmission time, in the middle of the channel transmission time, and at the end of the channel transmission time.

For example, new control information (e.g., only a portion of the DCI) may be defined. The terminal 10 may receive the new control information. For example, among the identifier of a DCI format, resource information, information related to a transport block, information related to Hybrid Automatic Repeat Request (HARQ), information related to multiple antennas, and information related to Physical Uplink Control Channel (PUCCH) included in the DCI, control information including only information related to the transport block may be used as the new control information. The same identifier may be attached to the control information arranged at the start of the channel transmission time, the control information arranged in the middle of the channel transmission time, and the control information arranged at the end of the channel transmission time, or different identifiers may be attached to them. The information included in the control information arranged at the start of the channel transmission time, the control information arranged in the middle of the channel transmission time, and the control information arranged at the end of the channel transmission time may be the same or different. For example, the first control information may include all of the above-described information, and the other control information may include some information, such as an identifier indicating the first control information, an identifier indicating the other control information, and/or difference information (for example, information related to multiple antennas).

For example, in a case where the base station 20 simultaneously transmits the control information and the DL data to the terminal 10, if there are a plurality of transport blocks (TB) or one transport block includes a plurality of code block groups (CBG), the control information may be used as control information for the TB or CBG to be transmitted after the transmission timing, or may be added and/or overwritten to the content sent in the first DCI by the additional control information for the single TB or CBG (for example, the updated value of the Modulation and Coding Scheme (MCI) index).

For example, the base station 20 may modulate and encode the control information and transmit the control information. The base station 20 may transmit the control information by mapping the control information onto a sequence of a reference signal or the like and transmitting the reference signal.

For example, the terminal 10 may include presence or absence of reception of additional control information in the UL data, and transmit the UL data to the base station 20. Furthermore, the feedback of the presence or absence of the additional control information may be periodically performed or aperiodically performed (for example, based on a request from a base station). If the additional control information (DCI) is not received, the presence or absence of the additional control information may be reported to the base station 20 as the feedback information.

The base station 20 may semi-statically configure a resource for transmitting control information for the terminal 10 by using RRC signaling or the like. Additionally or alternatively, the base station 20 may dynamically configure a resource to transmit control information by using another DCI.

(4. UL Data Transmission+UL Control Information Transmission)

If transmission of UL data (for example, PUSCH) is scheduled for the terminal 10, the terminal 10 may transmit one or more contiguous transport blocks and simultaneously transmit one or more items of control (feedback) information associated with the transport blocks.

For example, if the terminal 10 receives additional control information (DCI) during transmission of the PUSCH, the terminal 10 may report presence or absence of the reception of the additional control information to the base station 20 as the feedback information. Furthermore, the feedback of the presence or absence of the reception of the additional control information may be periodically performed or aperiodically performed (for example, based on a request from a base station). If the additional control information (DCI) is not received, the presence or absence of the reception of the additional control information may be reported to the base station 20 as the feedback information.

For example, if the terminal 10 moves and/or rotates in the middle of transmitting the PUSCH and the beam needs to be changed, the terminal 10 may report, to the base station 20, information on the changed beam, as the feedback to the base station 20.

For example, the carrier on which the terminal 10 transmits data and the carrier on which the terminal 10 transmits control information may be the same or different. When the carrier on which the terminal 10 transmits data and the carrier on which the terminal 10 transmits control information are different, the base station 20 (or the terminal 10) may configure information indicating a correspondence relationship between the carrier on which the terminal 10 transmits data and the carrier on which the terminal 10 transmits control information, and the base station 20 (or the terminal 10) may transmit, to the terminal 10 (or the base station 20), a notification of the configured information. The correspondence may also be specified in a technical specification.

For example, new feedback information may be specified as the feedback information. For example, the terminal 10 may transmit only a portion of the existing feedback information, as the feedback information.

For example, the terminal 10 may modulate and/or encode feedback information and transmit the feedback information. Furthermore, for example, the terminal 10 may transmit the feedback information by mapping the feedback information onto a sequence of a reference signal and/or a sequence of a preamble.

For example, when the terminal 10 transmits information corresponding to NACK, as the feedback information, the terminal 10 may include one of the following or a combination of the following in (or instead of) the NACK/CSI report (CQI/RI/PMI).

Beam report (for example, an index of another candidate beam, an L1-RSRP measurement, or the like)

Redundancy Version (RV) request (for example, information indicating the RV for retransmission)

Sounding Reference Signal (SRS) (for example, when the SRS is transmitted, the base station 20 interprets it as equivalent to NACK and corrects the transmission parameters based on the reception result of the SRS and the radio propagation path reciprocity)

For example, a radio resource (a time and frequency domain resource) that the terminal 10 uses to transmit feedback information may be semi-statically configured by RRC signaling or the like, configured and activated by a MAC CE or the like, or dynamically assigned by L1 signaling or the like.

For example, if a radio resource that the terminal 10 uses to transmit feedback information is configured by the RRC signaling, the terminal 10 may use the radio resource only within a certain period of time (for example, within a particular slot) when DL scheduling information is received in DCI.

For example, when a PUSCH is assigned to the terminal 10 as a resource for transmitting feedback information, the terminal 10 may perform the following operations.

For example, in a case where feedback information corresponding to ACK is to be transmitted, the terminal 10 may transmit a Buffer Status Report (BSR) by using a MAC CE. As a result, the terminal 10 can transmit, to the base station 20, a notification of the amount of remaining data to be transmitted.

For example, the terminal 10 may transmit a beam report and/or an RV request by using a MAC CE when the feedback information corresponding to NACK is to be transmitted.

(5. UE Capability)

For example, the terminal 10 may report, to the base station, whether reception of one or more continuous transport blocks and reporting of the feedback information, such as channel quality information or a retransmission request generated based on the received information, can be simultaneously performed, as the capability information.

For example, the terminal 10 may report, to the base station 20, whether one or more contiguous transport blocks and one or more control information associated with the transport blocks can be received on the same or different channels or signals, as the capability information.

For example, the terminal 10 may report, to the base station 20, whether transmission of one or more consecutive transport blocks and reception of control information, such as a retransmission request, associated with the transmission can be simultaneously performed, as the capability information.

For example, the terminal 10 may report, to the base station 20, whether one or more contiguous transport blocks and one or more control information associated with the transport blocks can be transmitted on the same or different channels or signals, as the capability information. For example, the terminal 10 may transmit, to the base station 20, the capability information on simultaneous transmission, simultaneous reception, or simultaneous transmission and reception, as described in the embodiments.

For example, the terminal 10 may report, to the base station 20, whether simultaneous reception on the same carrier (Full Duplex) can be supported and/or a combination of carriers that can support simultaneous transmission and reception, as the UE capability.

For example, if the carrier for performing simultaneous transmission and reception of data and feedback and/or control information is different from the carrier for performing transmission and reception of data, a plurality of candidate carriers may be configured, and switching/fallback may be performed in a case where the communication state of the initially planned carrier is not good.

Alternatively, feedback and/or control information may be simultaneously transmitted and received on multiple carriers. Additionally or alternatively, frequency hopping between carriers may be performed in a configured or defined pattern. (1. DL data reception+UL feedback transmission), (2. DL data reception+DL control information reception), (3. UL data transmission+DL control information reception), (4. UL data transmission+UL control information transmission), and (5. UE capability) may be used separately or in combination. For example, in a case where (1. DL data reception+UL feedback transmission) and (2. DL data reception+DL control information reception) are combined, the terminal 10 may receive a downlink channel (for example, PDCCH or PDSCH) including one or more transport blocks and, at the same time, receive one or more items of control information related to the transport blocks on the same channel or different channels, and transmit feedback information, such as a retransmission request generated based on the reception of the transport blocks.

(Device Configuration)

Next, a functional configuration example of the terminal 10 and the base station 20 which execute the above-described processing operations is described. The terminal 10 and the base station 20 are provided with all functions described in the embodiments. However, the terminal 10 and the base station 20 may be provided with partial functions among the all functions described in the embodiments. Note that, the terminal 10 and the base station 20 may be collectively referred to as a communication device.

<Terminal>

Figure 10:
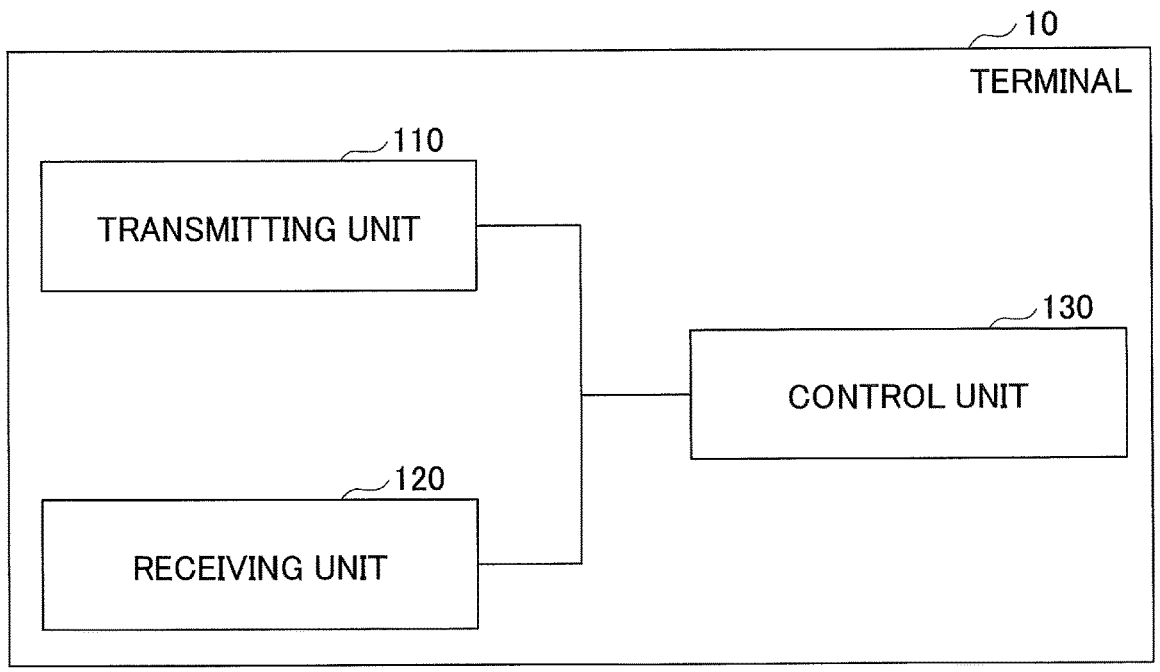
FIG. 10 is a diagram illustrating an example of a functional configuration of a terminal.

FIG. 10 is a diagram illustrating an example of a functional configuration of the terminal 10. As illustrated in FIG. 10, the terminal 10 includes a transmitting unit 110, a receiving unit 120, and a control unit 130. The functional configuration illustrated in FIG. 10 is illustrative only. A functional division and the names of the functional units may be any division and name as long as the operation according to the embodiments can be executed. Note that, the transmitting unit 110 may be referred to as a transmitter, and the receiving unit 120 may be referred to as a receiver.

The transmitting unit 110 creates transmission from transmission data, and wirelessly transmits the transmission signal. The transmitting unit 110 may form one or a plurality of beams. The receiving unit 120 wirelessly receives various signals, and acquires a signal of a higher layer from a received physical layer signal. In addition, the receiving unit 120 includes a measurement unit that performs measurement of a signal that is received to obtain received power or the like.

The control unit 130 performs control of the terminal 10. Note that, a function of the control unit 130 which relates to transmission may be included in the transmitting unit 110, and a function of the control unit 130 which relates to reception may be included in the receiving unit 120.

For example, the transmitting unit 110, the receiving unit 120, and the control unit 130 of the terminal 10 may perform UL feedback transmission during DL data reception. The receiving unit 120 and the control unit 130 of the terminal 10 may receive the DL control information during the DL data reception. The transmitting unit 110, the receiving unit 120, and the control unit 130 of the terminal 10 may receive DL control information during UL data transmission. The transmitting unit 110 and the control unit 130 of the terminal 10 may transmit UL control information during the UL data transmission.

<Base Station 20>

Figure 11:
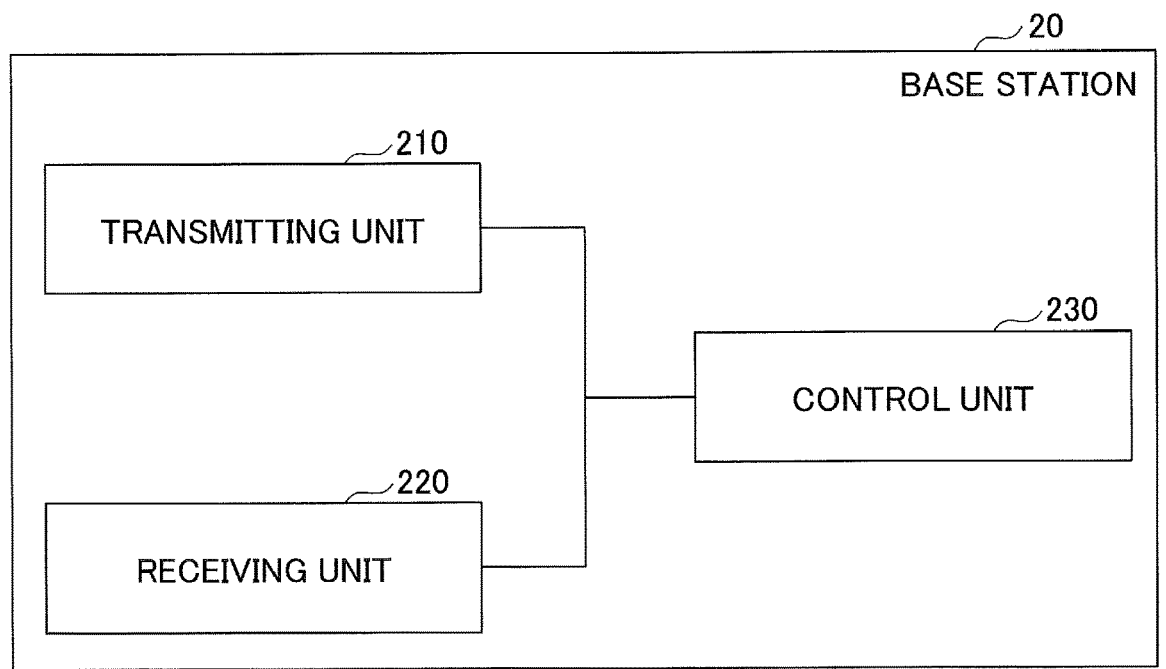
FIG. 11 is a diagram illustrating an example of a functional configuration of a base station.

FIG. 11 is a diagram illustrating an example of a functional configuration of the base station 20. As illustrated in FIG. 11, the base station 20 includes a transmitting unit 210, a receiving unit 220, and a control unit 230. A functional configuration illustrated in FIG. 11 is illustrative only. A functional division and the names of the functional units may be any division and name as long as the operation according to the embodiments can be executed. Note that, the transmitting unit 210 may be referred to as a transmitter, and the receiving unit 220 may be referred to as a receiver.

The transmitting unit 210 includes a function of generating a signal to be transmitted to the terminal 10 side, and wirelessly transmitting the signal. The receiving unit 220 includes a function of receiving various signals transmitted from the terminal 10, and acquiring, for example, information of a higher layer from the received signals. In addition, the receiving unit 220 includes a measurement unit that performs measurement of a signal that is received to obtain received power or the like.

The control unit 230 performs control of the base station 20. Note that, a function of the control unit 230 which relates to transmission may be included in the transmitting unit 210, and a function of the control unit 230 which relates to reception may be included in the receiving unit 220.

For example, the transmitting unit 210, receiving unit 220, and the control unit 230 of the base station 20 may perform UL feedback reception during DL data transmission. The transmitting unit 210 and the control unit 230 of the base station 20 may transmit DL control information during DL data transmission. The transmitting unit 210, the receiving unit 220, and the control unit 230 of the base station 20 may transmit DL control information during UL data reception. The receiving unit 220 and the control unit 230 of the base station 20 may receive the UL control information during the UL data reception.

<Hardware Configuration>

The block diagrams (FIG. 10 and FIG. 11) which are used in description of the embodiments illustrate blocks in a functional unit. The functional blocks (components) are implemented by a combination of hardware and/or software. In addition, means for implementing respective functional blocks is not particularly limited. That is, the respective functional blocks may be implemented by one device in which a plurality of elements are physically and/or logically combined. In addition, two or more devices, which are physically and/or logically separated from each other, may be directly and/or indirectly connected (for example, in a wired manner and/or a wireless manner), and the respective functional blocks may be implemented by a plurality of the devices.

Figure 12:
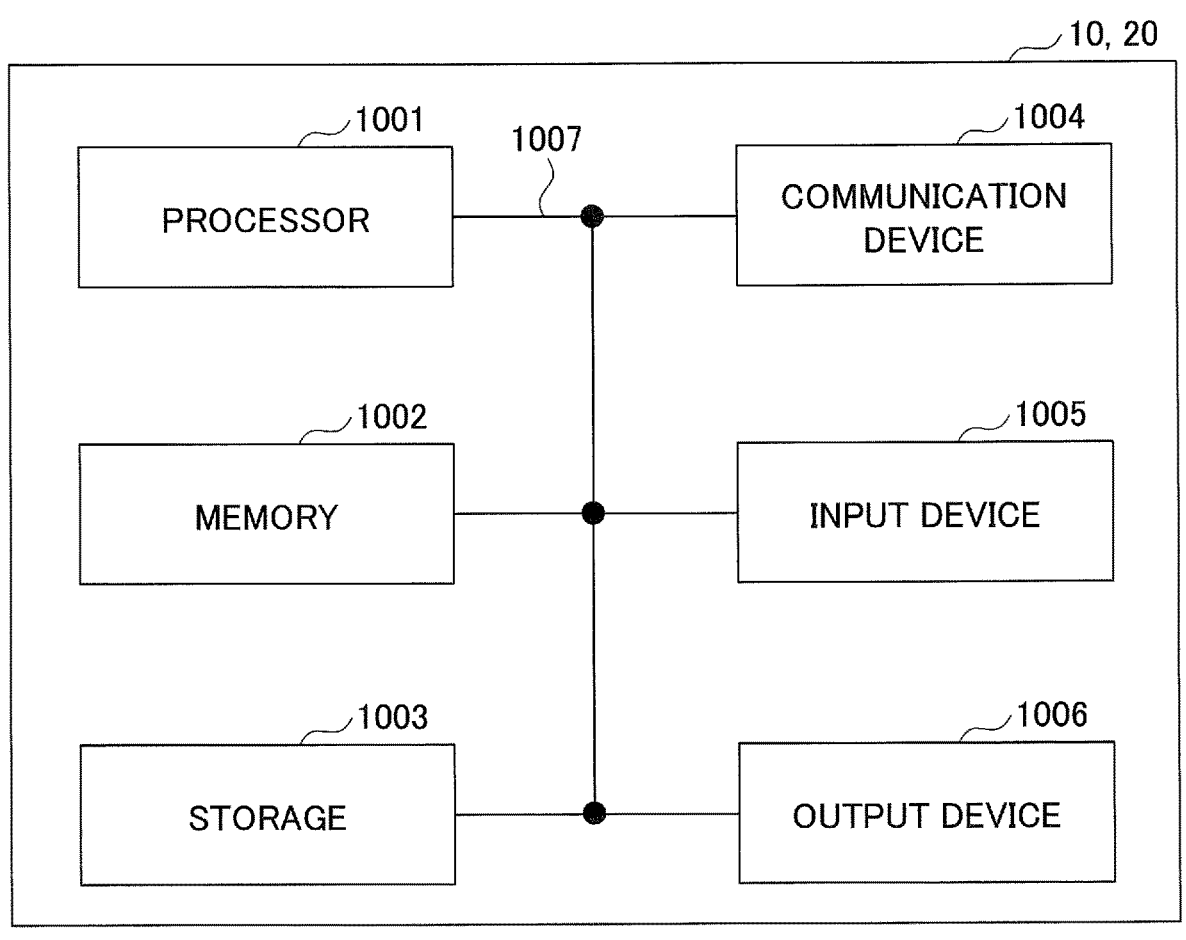
FIG. 12 is a diagram illustrating an example of the hardware configuration of the terminal and the base station.

For example, each of the terminal 10 and the base station 20 according to an embodiment of the present invention may function as a computer performing the process according to the embodiments. FIG. 12 is a diagram illustrating an example of a hardware configuration of the terminal 10 and the base station 20 according to the embodiments. Each of the above-described terminal 10 and base station 20 may be physically configured as a computer device including a processor 1001, a memory 1002, an storage 1003, a communication unit 1004, an input unit 1005, an output unit 1006, a bus 1007, and the like.

In the following description, the term "device" can be replaced with a circuit, a device, a unit, or the like. The hardware configuration of the terminal 10 and the base station 20 may include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication unit 1004, and reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module, or data from the storage 1003 and/or the communication unit 1004 to the memory 1002, and executes various processes according to these. As the program, a program is used that causes a computer to execute at least a part of the operations described in the above-described embodiments. For example, the transmitting unit 110, the receiving unit 120, and the control unit 130 of the terminal 10 illustrated in FIG. 10 may be implemented by a control program that is stored in the memory 1002 and that is operated by the processor 1001. Furthermore, for example, the transmitting unit 210, the receiving unit 220, and the control unit 230 of the base station 20 illustrated in FIG. 11 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, or the like, which can be executed for implementing the process according to one embodiment of the present invention.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The storage 1003 may be referred to as an auxiliary storage device. The above-described storage medium may be, for example, a database including the memory 1002 and/or the storage 1003, a server, or any other suitable medium.

The communication unit 1004 is hardware (transmitting and receiving device) for performing communication between computers through a wired network and/or a wireless network, and is also referred to, for example, as a network device, a network controller, a network card, a communication module, or the like. For example, the transmitting unit 110 and the receiving unit 120 of the terminal 10 may be implemented by the communication unit 1004. Furthermore, the transmitting unit 210 and the receiving unit 220 of the base station 20 may be implemented by the communication unit 1004.

The input unit 1005 is an input device (e.g., a keyboard, a mouse, a microphone, a switch, a button, and/or a sensor) that receives an external input. The output unit 1006 is an output device (e.g., a display, a speaker, and/or an LED lamp) that performs output toward outside. The input unit

1005 and the output unit 1006 may be configured to be integrated (e.g., a touch panel).

Each device, such as the processor 1001 and the memory 1002, is also connected by the bus 1007 for communicating information. The bus 1007 may be formed of a single bus or may be formed of different buses between devices.

The terminal 10 and the base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented by at least one of these hardware components.

Conclusion of the Embodiments

In the specification, at least the terminal and the base station described below are disclosed.

A terminal including a receiving unit that receives a transport block, and that receives, at a first timing at which a portion of the whole transport block is received, control information on another portion of the transport block to be received at a second timing after the first timing; and a transmitting unit that transmits feedback information on reception of the control information while the receiving unit receives the transport block.

According to the above-described configuration, the terminal can reduce a temporal gap associated with control by executing a data reception process and a control information reception process in parallel.

The receiving unit may receive a plurality of items of control information during the reception of the transport block, and the plurality of items of control information may be discontinuously allocated in the transport block in a direction of time.

According to the above-described configuration, a parameter to be applied can be changed on a per transport block portion basis.

A first carrier on which the receiving unit receives the transport block may differ from a second carrier on which the receiving unit receives the control information.

According to the above-described configuration, even in a case of TDD, a data reception process and a control information reception process can be executed in parallel.

A base station includes a transmitting unit that transmits a transport block, and that transmits control information on a portion of the whole transport block; and a receiving unit that receives, while the transmitting unit transmits the transport block, feedback information on reception of the control information.

With the above-described configuration, the base station can reduce a temporal gap associated with control by executing a data transmission process and a control information transmission process in parallel.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 10 and the base station 20 are described using the functional block diagrams, but such devices may be implemented by hardware, software, or a combination thereof. Software executed by the processor included in the terminal 10 according to the embodiments of the present invention and software executed by the processor included in the base station 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present specification and may be provided by any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present specification may be applied to Long Term Evolution (LTE), LTE-advanced (LTE-A), SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended based on these standards.

The processing procedures, the sequences, the flowcharts, and the like of the respective aspects/embodiments described in the present specification may be reversed in order provided that there is no contradiction. For example, the method described in the present specification presents elements of various steps with an exemplary order and is not limited to a presented specific order.

In the present specification, a specific operation to be performed by the base station 20 may be performed by an upper node in some cases. In the network including one or more network nodes including the base station 20, various operations performed for communication with the terminal 10 can be obviously performed by the base station 20 and/or any network node (for example, an MME, an S-GW, or the like is considered, but it is not limited thereto) other than the base station 20. A case is exemplified above in which there is one network node other than the base station 20. The one network node may be a combination of a plurality of other network nodes (e.g., MME and S-GW).

The aspects/embodiments described in this specification may be used alone, in combination, or switched with implementation.

The terminal 10 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station 20 may be defined by those skilled in the art as a NodeB (NB), enhanced node B (eNB), base station, gNB, or several appropriate terminologies.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology. The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like. The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology. The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B. Any one of a radio frame, a subframe, a slot, a mini slot, and a symbol indicates a time unit for transmitting a signal. As a radio frame, a subframe, a slot, a mini slot, and a symbol, different names corresponding to them may be used. For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 10) to each terminal 10 in units of TTIs. The definition of the TTI is not limited thereto. The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI. When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled. A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like. Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology. Furthermore, a time domain of an RB may include one or more symbols and may be a length of one slot, one mini slot, one subframe, or one TTI. One TTI, one subframe, or the like may be formed of one or more resource blocks. Furthermore, one or more RBs may be referred to as a physical resource block (PRB: Physical RB), a sub carrier group (SCG: Sub-Carrier Group), a resource element group (REG: Resource Element Group), a PRB pair, an RB pair, or the like. Furthermore, the resource block may be formed of one or more resource elements (RE: Resource Element). For example, one RE may be a radio resource region of one subcarrier and one symbol.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The description "based on" in this specification does not represent "only based on" unless otherwise stated. In other words, description of "based on" represents both "only based on" and "at least based on."

In this specification or the appended claims, in a case where "include," "including," and a modification thereof are used, these terms are intended as comprehensive terms similar to "comprising." In addition, a term "or" that is used in this specification and the appended claims is not intended as an exclusive OR.

In the entire present disclosure, for example, when an article such as "a," "an," and "the" in English is added by a translation, the article may include multiple things, unless the context explicitly indicates that the article does not include the multiple things.

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS

10 terminal
110 transmitting unit
120 receiving unit
130 control unit
20 base station
210 transmitting unit
220 receiving unit
230 control unit
1001 processor
1002 memory
1003 storage
1004 communication device
1005 input device
1006 output device

The invention claimed is:
1. A terminal comprising:
a receiver that receives a transport block according to a control information, and that receives, at a first timing at which a portion of the whole transport block is received, additional control information that updates the control information for another portion of the transport block to be received at a second timing after the first timing; and
a transmitter that transmits feedback information on reception of the control information while the receiver receives the transport block,
wherein the receiver is configured to perform processing of data reception and processing of control information reception in parallel, and the transmitter reports, to a base station, capability information of performing the processing of data reception and the processing of control information reception in parallel, wherein the transmitter further transmits data reception feedback information on reception of the portion of the whole transport block, and wherein the additional control information includes at least one transmission parameter updated based on the data reception feedback.

2. The terminal of claim 1, wherein the receiver receives a plurality of items of control information during the reception of the transport block, and wherein the plurality of items of control information is discontinuously allocated in the transport block in a direction of time.

3. The terminal of claim 1, wherein a first carrier on which the receiver receives the transport block differs from a second carrier on which the receiver receives the control information.

4. A base station comprising:

a transmitter that transmits a transport block according to a control information, and that transmits, at a first timing at which a portion of the whole transport block is transmitted, additional control information that updates the control information for another portion of the transport block to be transmitted at a second timing after the first timing, and a receiver that receives, while the transmitter transmits the transport block, feedback information on reception of the control information, wherein the transmitter is configured to perform processing of data transmission to a terminal and processing of control information transmission to the terminal in parallel, and the receiver receives, from the terminal, a report about capability information of performing processing of data reception and processing of control information reception in parallel, wherein the receiver further receives data reception feedback information on reception of the portion of the whole transport block, and wherein the additional control information includes at least one transmission parameter updated based on the data reception feedback.

\* \* \* \* \*